April 30, 1963   C. V. SMYTHE ETAL   3,087,859
MUCONOMYCIN
Filed March 9, 1961   3 Sheets-Sheet 1

3,087,859
MUCONOMYCIN

Carl V. Smythe, Moorestown, and Kenneth S. Kraskin, Riverside, N.J., assignors to Rohm & Haas Company, Philadelphia, Pa., a corporation of Delaware
Filed Mar. 9, 1961, Ser. No. 94,488
3 Claims. (Cl. 167—65)

This invention concerns a new and useful organic chemical compound, a muconate. The invention also concerns a method for producing this compound by a metabolic process and pesticidal compositions comprising this compound.

The invention provides, in one of its embodiments, a new organic chemical compound, a muconate. This compound is characterized by the following features.

Molecular formula: $C_{27}H_{34}O_9$
Calculated: carbon 64.52%, hydrogen 6.82%, oxygen 28.67%
Found: carbon 64.40%, hydrogen 6.77%, oxygen 28.79%
Optical rotation: $[\alpha]_D^{30} = +192°$ (c. 1.2% in benzene)
Molecular weight: $496 \pm 15$
Melting point: decomposes over 240° C.

One peak, λ max., in the ultraviolet region of the spectrum in the range of 250 to 270 milimicrons;

An extinction coefficient maxima, E max., in the range of 21,000 to 26,000;

At least three methyl groups;

The absence of alkoxyl groups, as methoxyl and ethoxyl groups;

Negative reaction with carbonyl reagents: p-nitrophenylhydrazine and semicarbazide hydrochloride;

Figure 1:
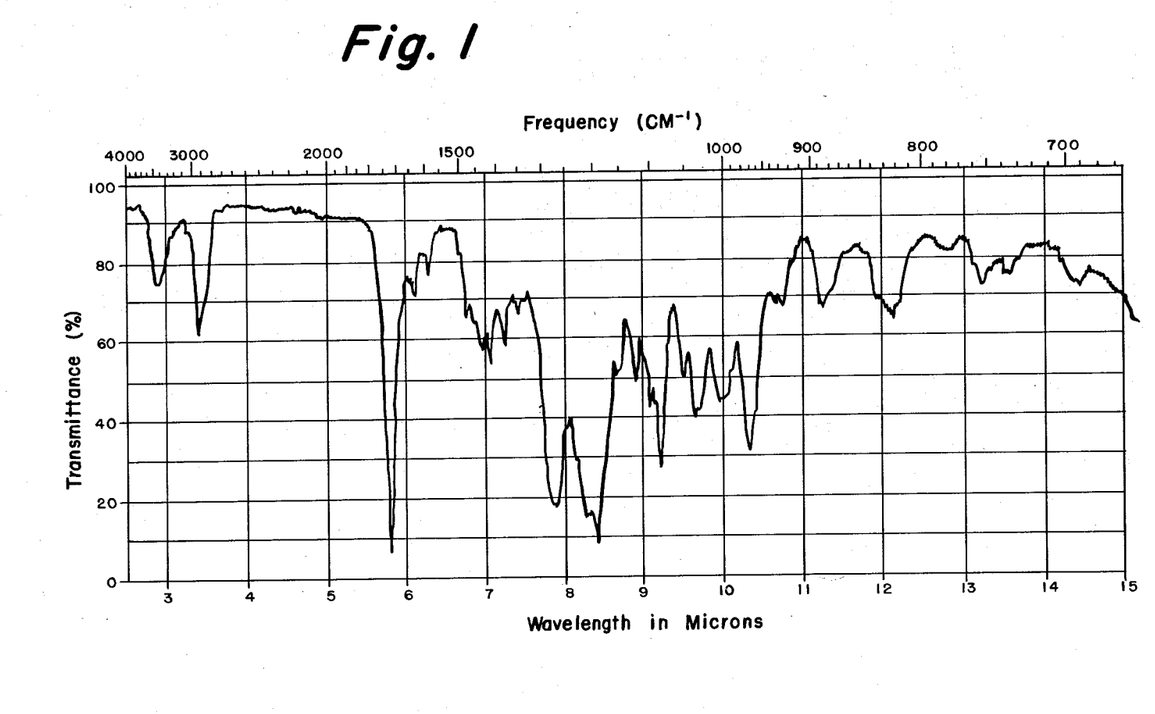

Saponification equivalent: 168;
Active hydrogen: 1.0.
An infrared spectrum:
FIG. I—Infrared spectrum of the muconate in a potassium bromide wafer;
Table I—List of infrared absorption bands.

TABLE I
*Absorption Bands of the Muconic Acid Compound*

| Wavelength | | Relative Intensity |
|---|---|---|
| Reciprocal centimeters | Microns | |
| 3,450 | 2.90 | Weak. |
| 2,960 | 3.38 | Do. |
| 1,725 | 5.82 | Very strong. |
| 1,640 | 6.11 | Weak. |
| 1,590 | 6.28 | Do. |
| 1,473 | 6.77 | Medium. |
| 1,428 | 6.98 | Do. |
| 1,410 | 7.08 | Do. |
| 1,382 | 7.23 | Weak. |
| 1,350 | 7.41 | Do. |
| 1,260 | 7.90 | Very strong. |
| 1,210 | 8.26 | Strong. |
| 1,188 | 8.41 | Very strong. |
| 1,151 | 8.69 | Medium. |
| 1,120 | 8.90 | Do. |
| 1,100 | 9.09 | Do. |
| 1,082 | 9.22 | Strong. |
| 1,050 | 9.51 | Medium. |
| 1,038 | 9.68 | Do. |
| 1,000 | 10.00 | Do. |
| 969 | 10.33 | Strong. |
| 939 | 10.67 | Weak. |
| 929 | 10.78 | Do. |
| 887 | 11.27 | Do. |
| 828 | 12.13 | Do. |
| 756 | 13.25 | Do. |
| 736 | 13.60 | Do. |
| 692 | 14.45 | Do. |

TABLE II
*Key to Relative Intensities*

| Reading: | Percent transmittance |
|---|---|
| Very strong | 0–5 |
| Strong | 5–25 |
| Medium | 75–25 |
| Weak | 100–75 |

Sharp absorption bands at the following frequencies, expressed in reciprocal centimeters and in microns.

TABLE III
*Transmittance*

| 0 to 25% | | 26 to 75% | |
|---|---|---|---|
| Reciprocal centimeters | Microns | Reciprocal centimeters | Microns |
| 1,725 | 5.82 | 1,473 | 6.77 |
| 1,260 | 7.90 | 1,428 | 6.98 |
| 1,210 | 8.26 | 1,410 | 7.08 |
| 1,188 | 8.41 | 1,151 | 8.69 |
| 1,082 | 9.22 | 1,120 | 8.90 |
| 969 | 10.33 | 1,100 | 9.09 |
| | | 1,050 | 9.51 |
| | | 1,038 | 9.68 |
| | | 1,000 | 10.00 |

The infrared spectrum being characterized by the following:

A hydroxyl peak at 3557 cm.$^{-1}$, in $CCl_4$;
Double bond absorption bands at 1637 and 1591 cm.$^{-1}$;
A carbonyl peak at 1725 cm.$^{-1}$ with shoulders at 1710, and 1740 cm.$^{-1}$, in $CCl_4$.

Figure 3:
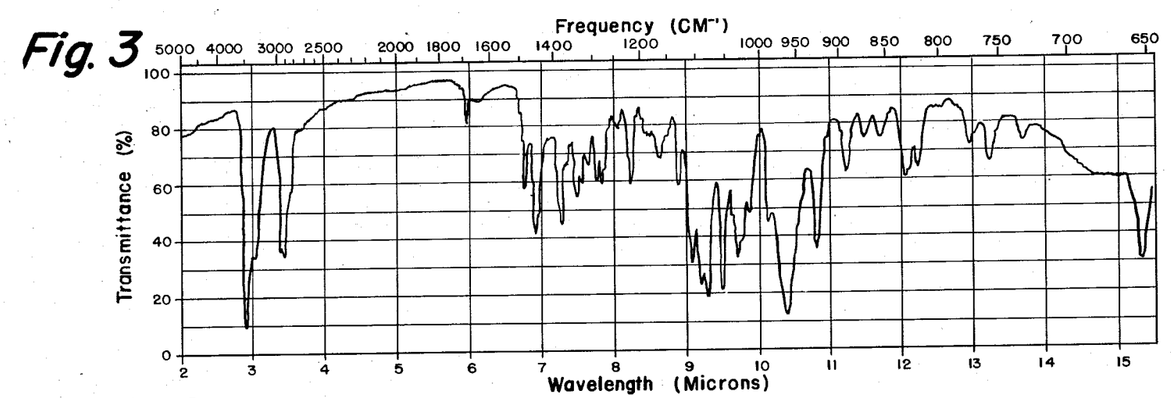

The compound of the invention is further characterized by three main products of alkaline hydrolysis:
(1) Muconic acid, (2) An alcohol (A) which is characterized by crystals of a M.P. of 156°–157° C.;

A molecular formula: $C_{15}H_{22}O_4$;
A molecular weight: 270–280 (Rast method); and two active hydrogens;

An infrared spectrum:
FIG. 3—Infrared spectrum of the alcohol in a potassium bromide wafer;
Table IV—List of infrared absorption bands.

TABLE IV

*Absorption Bands of Alcohol A*

| Wavelength | | Relative intensity |
|---|---|---|
| Reciprocal centimeters | Microns | |
| 3,440 | 2.92 | Very strong. |
| 3,300 | 3.03 | Medium. |
| 2,920 | 3.42 | Do. |
| 1,690 | 5.93 | Weak. |
| 1,480 | 6.76 | Medium. |
| 1,450 | 6.90 | Do. |
| 1,380 | 7.25 | Do. |
| 1,335 | 7.48 | Do. |
| 1,325 | 7.55 | Do. |
| 1,312 | 7.62 | Do. |
| 1,292 | 7.74 | Do. |
| 1,282 | 7.80 | Do. |
| 1,245 | 8.04 | Weak. |
| 1,217 | 8.22 | Medium. |
| 1,162 | 8.60 | Do. |
| 1,125 | 8.88 | Do. |
| 1,105 | 9.05 | Do. |
| 1,089 | 9.18 | Strong. |
| 1,078 | 9.27 | Do. |
| 1,055 | 9.48 | Do. |
| 1,032 | 9.69 | Medium. |
| 1,015 | 9.85 | Do. |
| 985 | 10.14 | Do. |
| 962 | 10.40 | Strong. |
| 922 | 10.82 | Medium. |
| 892 | 11.23 | Do. |
| 873 | 11.45 | Do. |
| 855 | 11.70 | Do. |
| 832 | 12.02 | Do. |
| 818 | 12.22 | Do. |
| 772 | 12.95 | Do. |
| 756 | 13.22 | Do. |
| 732 | 13.67 | Do. |
| 653 | 15.31 | Do. |

See Table II for: Key to Relative Intensities.

Sharp absorption bands at the following frequencies, expressed in reciprocal centimeters and microns.

TABLE V

*Transmittance*

| 0 to 25% | | 26 to 75% | |
|---|---|---|---|
| Reciprocal centimeters | Microns | Reciprocal centimeters | Microns |
| 3,440 | 2.92 | 3,300 | 3.03 |
| 1,089 | 9.18 | 2,920 | 3.42 |
| 1,078 | 9.27 | 1,480 | 6.76 |
| 1,055 | 9.48 | 1,450 | 6.90 |
| 962 | 10.40 | 1,380 | 7.25 |
| | | 1,335 | 7.48 |
| | | 1,325 | 7.55 |
| | | 1,312 | 7.62 |
| | | 1,292 | 7.74 |
| | | 1,282 | 7.80 |
| | | 1,217 | 8.22 |
| | | 1,162 | 8.60 |
| | | 1,125 | 8.88 |
| | | 1,105 | 9.05 |
| | | 1,032 | 9.69 |
| | | 1,015 | 9.85 |
| | | 985 | 10.14 |
| | | 922 | 10.82 |
| | | 892 | 11.23 |
| | | 873 | 11.45 |
| | | 855 | 11.70 |
| | | 832 | 12.02 |
| | | 818 | 12.22 |
| | | 772 | 12.95 |
| | | 756 | 13.22 |
| | | 732 | 13.67 |
| | | 653 | 15.31 |

The infrared spectrum of alcohol A being characterized by:

Two hydroxyl band at 3440 and 3300 cm.$^{-1}$ (in KBr);
A double bond band at 1690 cm.$^{-1}$; and
A band at 1380 cm.$^{-1}$ assignable to the vibrations of a C—CH$_3$ group (in KBr).

Alcohol A is further characterized by its diacetate:
Alcohol A—diacetate has a M.P. 147°–148° C. and a molecular formula of C$_{19}$H$_{26}$O$_6$ (calculated).

(3) An alcohol B which is characterized by:

Crystals of M.P. 102°–105° C.
A molecular formula: C$_6$H$_{10}$O$_3$

Figure 4:
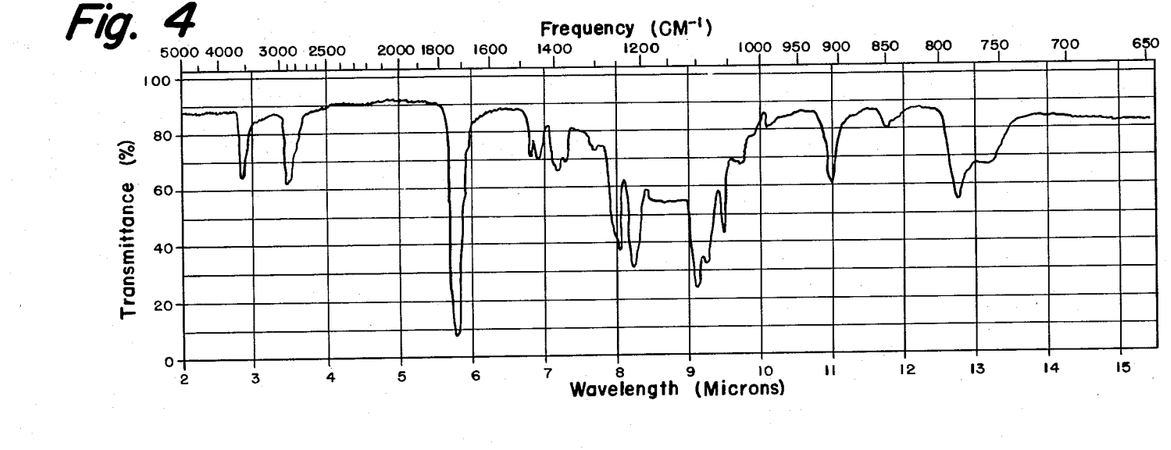

An infrared spectrum:
FIG. 4—infrared spectrum of alcohol B in a potassium bromide wafer;
Table VI—list of infrared absorption bands.

TABLE VI

*Absorption Bands of Alcohol B*

| Wavelength | | Relative intensity |
|---|---|---|
| Reciprocal centimeters | Microns | |
| 3,480 | 2.89 | Medium. |
| 2,920 | 3.43 | Do. |
| 1,729 | 5.79 | Very strong. |
| 1,470 | 6.80 | Do. |
| 1,450 | 6.91 | Do. |
| 1,390 | 7.18 | Do. |
| 1,372 | 7.28 | Do. |
| 1,302 | 7.67 | Do. |
| 1,248 | 8.01 | Do. |
| 1,215 | 9.22 | Do. |
| 1,100 | 9.09 | Strong. |
| 1,082 | 9.23 | Medium. |
| 1,058 | 9.47 | Do. |
| 1,031 | 9.72 | Do. |
| 990 | 10.09 | Weak. |
| 910 | 11.00 | Medium. |
| 850 | 11.77 | Weak. |
| 785 | 12.76 | Medium. |

See Table II for: Key to Relative Intensities.

Sharp absorption bands at the following frequencies, expressed in reciprocal centimeters and in microns.

TABLE VII

*Transmittance*

| 0 to 25% | | 26 to 75% | |
|---|---|---|---|
| Reciprocal centimeters | Microns | Reciprocal centimeters | Microns |
| 1,729 | 5.79 | 3,480 | 2.89 |
| 1,100 | 9.09 | 2,920 | 3.43 |
| | | 1,470 | 6.80 |
| | | 1,450 | 6.91 |
| | | 1,390 | 7.18 |
| | | 1,372 | 7.28 |
| | | 1,302 | 7.67 |
| | | 1,248 | 8.01 |
| | | 1,215 | 8.22 |
| | | 1,082 | 9.23 |
| | | 1,058 | 9.47 |
| | | 1,031 | 9.72 |
| | | 910 | 11.00 |
| | | 785 | 12.76 |

The infrared spectrum of alcohol B being characterized by:

A hydroxy band at 3480 cm.$^{-1}$ (KBr) and 3460 cm.$^{-1}$ (CHBr$_2$);
An ester band at 1729 cm.$^{-1}$(KBr) and (CHBr$_3$);
Absence of unsaturation in the 1600–1700 cm.$^{-1}$ region of the spectrum;
Negative reaction with carbonyl reagents: p-nitrophenylhydrazine and semicarbazide hydrochloride;
No reduction of ammoniacal silver in the Tollens test.

Alcohol B is further characterized by the following Formula I which is, preferably, β-methyl-α-hydroxyl-δ-valerolactone.

Alcohol B is further characterized by its ability to form the corresponding benzyhydryl amide.

Analysis for $C_{19}H_{23}NO_3$:
Calculated—carbon 72.82%, hydrogen 7.40%, nitrogen 4.47%.
Found—carbon 72.96%, hydrogen 7.43%, nitrogen 4.38%.

Amongst the properties of the muconate of the invention are the following:
(a) The compound forms a saturated tetrahydromuconate of M.P. 114°–115° C., and
(b) The compound forms a diacetate of a molecular weight of 581–593 (Rast).

Analysis for $C_{31}H_{38}O_{11}$:
Calculated—carbon 63.46%, hydrogen 6.53%.
Found—carbon 63.24%, hydrogen 6.68%.

The muconate of the invention is generally soluble in carrying degrees in organic liquid solvents having a dielectric constant within the range of 21.5 to 2.2, at 20° C.

Further proof of the composition of the muconate of the invention is provided by the fact that the sum of the molecular weights of muconic acid+alcohol A+alcohol B, less two moles of water provided by the hydrolysis of the muconate, gives a molecular weight of 502.6, i.e., a molecular weight within the found molecular weight of 496±15. Moreover, the molecular weight of the muconate of the invention corresponds closely to that of the diacetate of that muconate, with proper allowance for the molecular weight of the acetyl groups. Detailed description of these facts is provided further below.

Because the muconate compound contains a muconic acid moiety, the compound has been called Muconomycin.

The invention covers the muconate compound in all of its three stereo chemical forms: the cis-cis, the cis-trans, and the trans-trans isomers.

The muconate of the invention is a compound distinctly different from any other known heretofore. The production of this muconate by a strain of Myrothecium is unexpected in view of the work reported by P. W. Brian et al. in Nature, 157, 334, 1946. Brian et al. discuss the isolation of a compound, Glutinosin, from cultures of a Metarrhizium (a Myrothecium) and they describe Glutinosin as a material having an optical rotation of $$[a]_D^{20} = +54°$$

no melting point up to 300° C., a molecular weight of 755–920, and a molecular formula of $C_{48}H_{60}O_{16}$. It is evident that the muconate of the invention is distinctly different from Glutinosin and its discovery from another Myrothecium strain is quite unexpected.

The present invention provides, in another of its embodiments, a metabolic process for obtaining the muconate of the invention.

The muconate of the invention may be obtained from a Fungi Imperfecti of the genus Myrothecium. A strain that is well suited for producing the muconate is *Myrothecium verrucaria* ATCC 13667 (American Type Culture Collection, Washington, D.C.). When grown under the conditions disclosed in further details below, this microorganism produces the muconate in good yields.

The present invention is intended to include all strains of Myrothecium which produce the muconate compound of the invention, including mutants from the ATCC strain No. 13667, which may be produced by various means, such as by X-ray radiation, ultraviolet radiation, cobalt radiation, nitrogen mustard, or by natural means, and the like.

The present invention also provides muconate containing broths which are useful in numerous pesticidal applications. Of special interest are those broths containing at least 0.1 microgram per milliter of the muconate compound of the invention.

Further embodiments of the invention provide pesticidal compositions comprising the muconate compound of the invention.

The muconate producing strain ATCC No. 13667 has the following growth characteristics which may be observed after incubation at 28° C. for a period of seven days of growth on potato-dextrose agar: Growth is speading and abundant. Agar becomes covered with fine, white aerial septate mycelia. From the surface of cushion-shaped typical sporodochia, there arise closely associated conidiophores. Sporodochia are moderate to heavy; they are deep olive in color; they do not arise on stomata. Conidia are produced neither in picnidia, nor in acervuli but on free conidiophores. Conidia are one-celled, ovoid to elongate, subhyaline to dark and they are produced terminally from branched or unbranched conidiophores. Asexual spores are regularly produced; sexual spores are not found.

In accordance with the metabolic process of the invention for preparing the muconate compound, a strain, producing the muconate compound of the invention, such as strain ATCC No. 13667, is grown aerobically in the presence of a nutrient medium. Essentially, the utrient medium contains untilizable energy, assimilable carbon and nitrogen and nutrient salts. When the concentration of the muconate compound has reached the desired level, the muconate may be recovered from the nutrient medium and, if desired, it may be purified to its crystalline form. Alternatively, the spend nutrient medium containing the desired level of muconate may be employed, with or without concentrating, for various pesticidal applicaitons.

In accordance with the invention, the muconate producing strains may be grown in the presence of the above-specified nutrient medium, which may be provided as a solid or as a liquid medium. When the medium is liquid, there may be provided shallow stationary trays for growing the fungi as surface or shallow cultures, but preferably the process of the invention comprises developing the muconate producing strain in aerated, agitated, submerged cultures.

When it is desired to grow the muconate producing strains in the presence of a solid medium, it is preferable that it be provided to form relatively thin layers of porous and hydrophilic material. Preferred sources of utilizable energy, assimilable carbon and nitrogen, and nutrient salts are carbohydrate materials such as various sugars, startches, particulated cereals as rice, rye, rolled oats, wheat, and corn. Additional assimilable sources of nitrogen may be present; cereal middlings, milled grain, wheat middlings, or flour being suitable. If desired, the medium may be admixed with other insoluble nutrients or enriched by nutrients soluble in the water present. When the desired concentration of the muconate has been reached, it may be extracted with a suitable solvent from the moist, or the previously dried, media.

When it is desired to grow the muconate producing strains in the presence of an aqueous nutrient medium, the process may be carried out by growing the fungi as surface cultures on trays or under submerged aerobic conditions, in suitable containers. The medium includes, in addition to water, a utilizable source of energy, a source of assimilable carbon and nitrogen, and nutrient salts. Any substance that can be either oxidized and/or fermented may be a suitable source of energy production. A preferred source is a utilizable carbohydrate material, such as glucose, levulose, maltose, sucrose, lactose and xylose, cerelose, and the so-called soluble starches and dextrins and other water-soluble or partially water-soluble carbohydrate substances. Other oxidizable materials, such as fats, glycerol, glycols, or nitrogen-containing compounds, such as protein, may serve as energy and carbon sources. Economically, by-products from various processes, such as various milk products, molasses, or sulfite waste liquid may be utilized. When further vitamin or growth factors are required, they may be supplied as minor components of complex nutrients. The source of nitrogen is conveniently a utilizable complex proteinaceous material including soybean meal, cornsteep liquor, yeast extract, hydrolyzed casein, whey and whey powder, buttermilk, cottonseed meal, oat meal, peptone, amino acids, condensed fish solubles and meat extracts, as well as various other nitrogenous substances of vegetable or animal origin. Simpler nitrogen sources may also be provided including sodium or potassium nitrate, ammonium nitrate, ammonium tartrate, ammonium sulfate, and calcium nitrate. Preferably, there should also be present a source of nutrient mineral salts, in amounts in the range from traces to 5 percent, such as, for instance, phosphate ions, chloride ions, and magnesium ions. These may be in the form of, for instance, sodium chloride, calcium carbonate, and magnesium sulfate. Trace elements such as iron, copper, cobalt, zinc, sulfur, manganese, molybdenum, calcium, and aluminum may also be utilized with desirable results.

In the process of growing muconate producing strains, there may also be employed in the medium specific precursors of the muconate compound which tend to promote the formation of the muconate or of desirable derivatives thereof. All nutrients may be employed singly or in combination with one or more nutrients. In this invention, a source of nutrient is intended to include a mixture of nutrients since together such nutrients may be considered as being an assimilable source of nutrients.

To promote good yields of the muconate compound under aerobic, submerged growth conditions, the amount of an assimilable carbon source is from about .1 to about 10 percent, preferably from 0.5 to 5 percent, by weight of the nutrient medium. The amount of an assimilable nitrogen source is from 0.001 to 2, preferably from 0.01 to 1 percent by weight of nutrient medium. The solid or liquid growth medium is preferably free of interfering microorganism, it is preferably sterile. Sterilization of the medium may be effectuated by heating under pressure. Alternatively, to minimize the number of undesirable contaminants, the pH of the solid medium may be adjusted to a range within three to four with a suitable organic acid, such as lactic, acetic, malic, citric, or inorganic acids, including sulfuric or hydrochloric acid salts.

When the muconate producing strains are grown in submerged liquid nutrient, aeration should preferably be provided, at least for part of the time, at a rate at least sufficiently rapid to sustain the metabolic oxygen requirements of the fungus, preferably also to free the medium of undesirable metabolic products. A flow of sterile air at the rate of about 0.001 to 1.50 volumes and desirably 0.1 to 0.25 volume per volume of broth per minute gives good results. Simultaneously, mechanical agitation may be provided to give a peripheral speed of 200 to 1500 feet per minute. When necessary, antifoam compositions may be added to the media. Typical compositions are lauric acid, oleyl alcohol, oleic acid, silicones, lard oil, soybean oil, and the like. Also, wetting and dispersing agents may be desirable additives, the non-ionic types being preferred. Suitable for this purpose there may be mentioned ethylene oxide-propylene oxide condensates, alkylated aryl polyether alcohols, and polyethylene ethers of long-chain fatty acids or alcohols. Amounts may range from 0.001 to 3% or more, if desired.

In accordance with the process for growing the muconate producing strains, the growth temperatures range from about 20° to 40° C., preferably the temperatures range from 25° to 30° C.; the upper range being advisedly employed only for part of the time. Maximum yield is generally obtained in about 12 to 75 hours of fermentation at optimum conditions. Satisfactory yields may be obtained in shorter periods of time by employing heavier inoculum and optimum conditions. Longer periods may be used, if desired. During growth of the species of this invention, the pH range is maintained at least for a major part of the time in the range of 5 to 8, preferably in the range of 6 to 7.0. If desired, pH adjustments may be performed in a suitable manner by addition of bases or acids.

As the growth of the muconate producing strain proceeds, the presence of increasing amounts of muconate in the medium may be determined. Since the muconate compound is found in major part extra-cellularly in the aqueous phase of the nutrient medium, it is readily extractable from the growth medium with the assistance of suitable solvents. Any residual muconate that may be found in the filter cake, after filtration of the spent liquor, may also be extracted with such suitable solvents. If desired, muconate may be continuously removed from the nutrient medium as it is being produced. By feeding fresh nutrient medium to replace the spent portions, there may be developed a practical continuous process of producing the muconate. Presently, batch methods are fully adequate.

When the muconate concentration has reached the desired level in the aqueous medium, the Myrothecium-containing medium may be employed as such or the muconate compound may be separated from the spent medium. Separation may be effectuated by filtration, centrifuging, or by other suitable methods. As separation aids, there may be employed diatomaceous earth or other filtration aids.

Spent medium containing the muconate in at least an amount of 0.1 p.p.m., desirably in an amount of 10 p.p.m., is useful in agricultural applications, such as a liquid fungicide composition. However, instead of using the muconate containing spent medium, the medium may be concentrated by reduction of its water content, such as by evaporation. Also, the muconate compound may be recovered from the spent medium by any appropriate recovery procedure. The muconate compound may be purified by selective adsorption on inorganic or preferably a carbonaceous adsorptive material. Typical thereof are the activated carbon types, available commercially under various trade names, coconut shell charcoal, and the like; amongst the inorganic adsorbing types alumina, clays, bentonites, bauxites, magnesia, fuller's earth, silica gels, zeolite, and the like may be used. Preferably, the adsorbing material is employed in amounts ranging from 0.1 to 10%, more desirably, 0.20 to 0.5%, of the volume of fermentation broth. After the major proportion of the muconate is adsorbed, residual filtrate may be set aside and the adsorbent may be dried. The muconate may then be eluted from the adsorbent with one or more of the solvents for the antibiotic, preferably those having a dielectric constant from 1.5 to 35.0. In the purification of the muconate, resins may also be employed to adsorb impurities and undesirable components from the broth leaving essentially a solution of the muconate which may then be even further purified. In this manner, the mineral constituents of the nutrient broth may be removed by treating with an anion exchange resin. To minimize the effect of possible high colloidal concentration of the broth, the operation may be conducted upflow. Mixed bed may be employed.

Another convenient method for recovering the muconate from nutrient broth is with the aid of suitable solvents for the muconate, particularly water-immiscible ones. Suitable solvents are described above. In this manner, there is obtained a solvent extract rich in the muconate which may be used as such or which may be further processed as described hereinafter.

These extracts are useful in combatting fungi. Further concentration and purification of the muconate may be obtained by evaporating the solvent to yield an oily residue high in the muconate. If even further degrees of purity are desired, the residue may be taken up in a water-miscible solvent for the antibiotic such as acetone, methyl acetone, and the like. To this concentrate of the muconate, there may then be added water to give approximately a 5% to 20%, preferably a 10%, aqueous solvent. This causes the formation of a milky white colloidal solution. Heat and agitation and cooling may be applied to promote precipitation of the muconate. Generally, at least 75% to 85% of pure muconate is present in such a precipitate. It is a valuable composition of high toxicity to fungi.

Further purification to a crystalline muconate may be obtained by recrystallization from solvents such as lower ketones, lower alkyl acetates, aromatic hydrocarbons and lower alcohols, halogenated hydrocarbons, benzene, and other suitable ones listed above. With water-miscible solvents, water may be a helpful adjuvant to promote crystallization. The pure muconate antibiotic crystallizes out as minute transparent crystalline platelets. Its chemical and physical properties are described above. Crystalline forms of the muconate may be particularly desirable in biological, pharmaceutical, and medical applications.

DETERMINATION OF MUCONOMYCIN POTENCY BY STANDARD MUCONOMYCIN BIOACTIVITY TEST

Concentration of the muconate compound is determined by a modified agar plate diffusion method. Spores of Endomycopsis, collected from a potato-dextrose agar plate, are suspended in sterile water and standardized to about 10 million spores per milliliter of liquid by adjusting the number of spores to give a 60% light transmittancy at 525 m$\mu$ in a Junior Coleman spectrophotometer. One milliliter of this spore suspension is mixed with 10 milliliters of liquidfied potato-dextrose agar. The mixture is poured into Petri dishes where it is allowed to harden. Small wells, about 9 mm. in diameter, are cut in the agar and filled with 0.05 ml. of test solution. The plates are incubated at 26° C. for 26 hours. The test solution is measured by the diameter of the zone of inhibition. The diameter of the zone is compared and evaluated against a standard curve. That standard curve is determined by testing various concentrations of crystalline muconate against Endomycopsis under the standard conditions described above and plotting the logarithm of the concentration per milliliter against the diameter of the zone of inhibition. A straight line is derived from which the concentration of the pure muconate compound in any sample may be read.

The present application is a continuation-in-part of application Serial No. 775,311, filed November 20, 1958.

The following examples illustrate the preferred metabolic method for preparing the muconate compound of the invention, methods for treating it, and for preparing derivatives thereof. All parts are by weight unless specified otherwise. The examples are not to be considered as a limitation on the scope of the invention.

FERMENTATION IN SHAKER FLASKS

*Example 1*

A sterile liquid medium composed of 1% glucose, 0.1% peptone, 0.1% yeast extract, 0.05% potassium dibasic phosphate, 0.02% hydrated magnesium sulfate, and 0.5% rolled oats is adjusted to a pH of about 7 with alkali. It is dispensed in 100 ml. portions in 1 liter Erlenmeyer flasks. The flasks are inoculated with a final concentration of 1% spore suspension of a Myrothecium strain ATCC No. 13667 obtained from a potato-dextrose agar slant. Incubation is carried out on a shaker rotating at 260 r.p.m. in a constant temperature room at 25° to 28° C. After 65 hours, the pH of the fermentation broth is about 7. At that time, the concentration of the muconate compound of the invention is 115 $\mu$g./ml. The mycelium is separated from the broth by filtration with diatomaceous earth as a filtration aid.

The collected filtrate assays 205 $\mu$g./ml. of muconate. Its molecular weight is 496±15, and the molecular formula is $C_{27}H_{34}O_9$; its infrared spectrum is identical to that of FIG. I.

The collected filtrate is useful as such for combatting fungal infestations. A portion of the filtrate is evaporated to dryness and the residue taken up in 500 ml. of trichloroethylene. This composition, which may be further diluted to any desired concentration of muconate, is valuable in fugitoxic compositions.

*Example 1(a)*

In a like manner, a muconate producing strain of Myrothecium is grown on a potato-dextrose broth containing potato broth supplied with 1.2% glucose, 0.25% peptone, and 0.25% yeast extract. The temperature in the incubation room is maintained at about 30° C. After 60 hours, the fermentation broth has a potency of 100 $\mu$g./ml. of muconate. The mycelium is separated by centrifugation and the supernatent is collected. The muconate compound is isolated therefrom.

In a similar manner, there is used a soybean broth comprising 2% glucose and 3% soybean meal. Incubation temperature is 20° C. After 64 hours, a broth containing 85 micrograms per milliliter of muconate is collected by separating the liquid nutrient broth from the mycelium.

Likewise, a muconate producing myrothecium strain is grown in a glucose-peptone medium which includes 2% glucose and 1.5% peptone. Another useful medium contains sucrose and lactose instead of glucose. Yet, another growth medium contains 4% of a source of carbon in the form of a mixture of sulfite waste liquor from the manufacture of paper and molasses. The assimilable nitrogen, therefore, is made up with hydrolyzed casein, oat meal, and condensed fish solubles to provide 2% of assimilable nitrogen. The pH is adjusted to about 6.5. After 60 hours, the broth contains 180 $\mu$g./ml. of muconate. The broth, including mycelia, is evaporated at 25° C. to dryness. The dried light yellow mat is ground to yield a light-colored powder. Fifty parts of this powder are mixed with 50 parts of talc to provide a composition useful in combatting fungal infestations.

CULTIVATION IN FERMENTOR

*Example 2*

A 30-gallon batch of rolled oats-glucose medium, described above in Example 1, in a 50-gallon stainless steel tank fermentor, is inoculated with 2% by volume of a 96-hour culture of a strain of Myrothecium ATCC No. 13667. The culture broth is aerated at a rate of 0.25 volume of sterile air per minute and agitated by a propeller driven at about 280 r.p.m. After 65 hours, the pH of the broth is about 7.1. At that time, the mycelium is separated by filtration; the broth contains 170 $\mu$g./ml. of muconate.

In a similar manner, another muconate producing strain of Myrothecium is grown in a fermentor tank by inoculating the sterile medium with 10% of a 96-hour culture of the fungi. The medium is made up with yeast extract and soybean meal to provide 1% of assimilable nitrogen and wheat bran and sucrose and glucose in amounts to provide 0.5% of carbon. Lard oil in an amount of 0.005% is added to the medium as an antifoam and an alkylated aryl polyether alcohol detergent is added in an amount of 0.05%. The temperature is maintained at 30° C. The fermentation broth is aerated at the rate of 0.75 volume of sterile air per minute and agitated by a propeller driven at 300 r.p.m.'s. After 36 hours, a broth having a Muconomycin content of 180 μg./ml. micrograms is collected. It is useful as such in agricultural antifungal compositions. Also, a portion of the broth containing mycelium is exposed to an air-current at 30° C. and evaporated to dryness. The dry cake is pulverized; it assays for 20,000 micrograms of muconate. The powder is useful as such in fungitoxicant compositions comprising a carrier alone, such as talc, or in conjunction with a suitable wetting agent.

CULTIVATION ON STATIONARY SHALLOW TRAYS

Example 3

Myrothecium ATCC strain No. 13667 is grown on trays in a medium made up with 1% glucose, 1% peptone, 0.5% yeast extract, 0.5% potassium monobasic phosphate, 0.2% hydrated magnesium sulfate, and 1% rolled oats. After 72 hours, a thick superficial felt is formed. A broth containing 60 μg./ml. of muconate is collected by withdrawing broth from the tray. After eight days, the broth has a potency of 200 micrograms per milliliter of Muconomycin. It is useful in fungicidal compositions.

In a similar manner, there are employed media made of molasses, liquid whey, and cottonseed meal with like results.

CULTIVATION ON SOLID CULTURES

Example 4

A solid culture is made up with the following ingredients:

Rolled oats, 25 parts,
Bran, 25 parts,
Wheat middlings, 40 parts,
Lactic acid (50%), 3.5 ml., and
Tap water, 100 parts.

The ingredients are mixed and 60 grams are dispensed in culture bottles and sterilized. After cooling, this medium is inoculated with 5 milliliters of an aqueous spore suspension taken from a 7- to 10-day culture of Myrothecium ATCC strain No. 13667 grown on a potato-agar slant. The bottles are incubated for 7 days at 26° C. At that time, the bran medium is extracted by shaking with acetone. The extract yields 580 μg. of muconate per gram of original wet weight medium.

In a similar way, there may be used a solid medium made up of rice bran, 60 parts, wheat middlings, 40 parts, and corn flour, 5 parts, and tap water, 100 parts. After growing in a manner similar to that described above for 20 days, 560 micrograms of muconate per gram of original wet weight medium are recovered. A benzene extract shows marked toxicity against fungi.

Example 5

A solid culture is made up with the ingredients of the above example. Myrothecium ATCC strain No. 13667 is grown on the medium for 9 days at 30° C. The bran medium then is profusely covered with mycelia. It is air-dried and ground to yield a tan powder. The concentration of muconate is 2500 μg./gr. One hundred parts of this powder are mixed with 2 parts of an alkylol polyether alcohol and 1000 parts of petroleum distillate. This is a useful antifungal composition.

ISOLATION OF MUCONOMYCIN FROM CULTURE BROTHS

Example 6

A 20-gallon batch of fermented broth is filtered to remove mycelia using diatomaceous earth filtration aid. The filtrate is mixed with 0.3% weight volume of a commercial grade of activated charcoal to adsorb the muconate. The aqueous portion is set aside. The activated charcoal is air-dried. Elution of the muconate from the charcoal is effected with benzene in a Soxhlet extractor for 24 hours. A deeply colored concentrate is obtained. After evaporation of the benzene, there is obtained about 25 grams of a yellow-brown oil residue. One hundred parts of the residue are dissolved in 1000 parts of acetone. Water is added to give a final concentration of about 10% aqueous acetone. The solution is heated for about five minutes at 60° C. A tan white amorphous precipitate is formed upon gradual cooling to 20° C. Filtration yields about 6 grams of a precipitate which is about 85% pure muconate.

In another isolation, the muconate is removed from a fermentation filtrate by mixing it with 10% of a commercial grade of activated carbon. The carbon is air-dried at about 20° C. and subsequently the muconate is eluted from the charcoal with acetone.

Example 7

A 15-liter batch of filtered nutrient broth is extracted twice with 8 liters of benzene. The benzene extracts are combined. Two hundred parts of the residue are taken up in 5 parts of acetone. Addition of 10 volumes of water for each volume of acetone gives a turbid suspension. This suspension is heated and then gradually allowed to cool to 15° C. Small crystals precipitate. These crystals are muconate, of 85% purity.

Pure muconate is obtained by recrystallization from water.

Alternatively to biochemical synthesis, the muconate of the invention may be synthesized by chemical methods.

The muconate compound of the invention is unique in its chemical structures and properties. This is further illustrated by the following non-limiting examples.

Example 8

A. BASIC HYDROLYSIS OF THE MUCONATE ther illustrated by the following non-limiting examples. there is placed $1.90 \times 10^{-3}$ moles of muconate compound with 15 parts of 3% aqueous sodium hydroxide and 3 parts of ethanol. The mixture is heated gently on a steam bath for 30 minutes. The reaction mixture is then cooled to room temperature and it is extracted with chloroform. The combined extracts are dried over anhydrous magnesium sulfate. A colorless, clear, solid residue is obtained which crystallizes immediately on standing at room temperature.

(1) *Alcohol A component.*—The residue is dissolved in chloroform and recrystallized from an ether chloroform solution yielding flat needles of melting point 156°–157° C. Analysis shows $C_{15}H_{22}O_4$: carbon 67.38% (theoretical 67.64%), hydrogen 8.38% (theoretical 8.32%), oxygen 23.93% (theoretical 24.02%), molecular weight (Rast) 270 and 280 (theoretical 267.4).

The infrared spectrum of this component shows hydroxy bands at 3440 and 3300 cm.$^{-1}$, a weak double bond band at 1690 cm.$^{-1}$, and a band at 1380 cm.$^{-1}$ assignable to the vibrations of a C—CH$_3$ group. Tables IV and V report the absorption bands in the infrared region spectrum of alcohol A.

(2) *Muconic acid component.*—The basic reaction mixture is made strongly acidic, to about a pH of about 2, and extracted with ether several times. The combined extracts are dried over anhydrous magnesium sulfate. After removal of the drying agent and solvent, a powder with a yellow tint remained as residue. Analysis of the residue shows $C_6H_6O_4$: carbon 50.59% (theoretical 50.70%) and hydrogen 4.35% (theoretical 4.25%). Its melting point is found to be: 190.5° to 191° C.

This acid component (57.4 parts) is reduced over palladium on charcoal, in ethanol. Two moles of hydrogen are absorbed per mole of acid. The product is a white solid melting at 152°–153° C. The infrared spectrum of the reduced acid is superimposable on that of adipic acid. A mixture melting point determination with adipic acid shows no depression. This and further identification confirms that this acid component is muconic acid.

(3) *Alcohol B component.*—The acidified reaction mixture is then extracted with chloroform and the extracts are combined and dried over anhydrous magnesium sulfate. After removal of the drying agent and of the solvent, a colorless, clear oil remained, which crystallized immediately on standing at room temperature. This component was purified yielding a sample melting at 102.5° to 103° C. Analysis shows $C_6H_{10}O_3$: carbon 55.12% (theoretical 55.37%), hydrogen 7.78% (theoretical 7.74%), and oxygen 36.82% (theoretical 36.87%).

The equivalent weight of this alcohol is found to be 128.

The alcohol is soluble in water.

The infrared spectrum of this alcohol shows strong bands at 3480 cm.$^{-1}$ (KBr) or 3460 cm.$^{-1}$ (CHBr$_3$) (hydroxyl band) and at 1729 cm.$^{-1}$ (KBr) or (CHBr$_3$) (ester). No evidence of unsaturation is present in the 1600–1700 cm.$^{-1}$ region of the spectrum. Tables VI and VII report the absorption bands in the infrared region spectrum of alcohol B.

The sum of the molecular weights of the three components of the muconate obtained on alkaline hydrolysis is as follows:

Muconic acid: $C_6H_6O_4$
Alcohol A: $C_{15}H_{22}O_4$
Alcohol B: $C_6H_{10}O_3$
Total weight: $C_{27}H_{38}O_{11}$
Less water of hydrolysis: $-2(H_2O)=C_{27}H_{34}O_9$
Molecular weight: 503

Thus, the sum of the molecular weight of the components is in agreement with the molecular weight, 496±15, determined for the muconate. This confirms the uniqueness of the muconate of the invention and its distinctness over Glutinosin (molecular weight: 755–920).

*Example 9*

(1) *Acylation of alcohol A.*—In a 1-necked flask there is placed 71.5 parts of alcohol A. To this there is added 4 ml. of anhydrous pyridine and 3 ml. of acetic anhydride. The solution is heated on a steam bath for 10 minutes. The solution is then cooled to 2 ml. of water added. The solvent is removed by distillation at reduced pressure and the oil residue which remains is taken up in chloroform and washed twice with sulfuric acid and twice with water. The organic layer is separated and dried over anhydrous magnesium sulfate. After removal of the drying agent and the solvent, the residue is taken up in benzene-hexane mixture (4:1). The solution is purified by chromotography on alumina. After further purification, a crystalline product is obtained by the addition of water, melting point 147° to 148° C. Analysis shows $C_{19}H_{26}O_6$: carbon 65.19% (theoretical 65.12%), hydrogen 7.27% (theoretical 7.47%), and a molecular weight (Rast) of 335 (theoretical 350).

The percent acetate calculated as CH$_3$CO— is found to be 24.20 (the expected value for a diacetate is 24.56%).

The infrared spectrum (CCl$_4$) of the acetate contains strong bands at 1749 and 1241 cm.$^{-1}$ attributable to vibrations of the acetate grouping. No hydroxyl band is evident in the spectrum.

*Example 9*

(2) *Benzyhydryl amide of alcohol B.*—The alcohol B (16 parts) is placed in a vial with 0.5–1 ml. of benzyhydrylamine. The vial is stoppered and the solution is heated on a steam bath for one hour. The reaction mixture is then dissolved in 10 ml. of chloroform and the resulting solution washed with a .1 N HCl solution and then with water until the washings are nearly neutral to litmus. The chloroform solution is then dried over anhydrous magnesium sulfate and the drying agent and solvent removed. An oil with a yellow tint remains as residue which crystallizes on standing at room temperature. The crystalline residue is dissolved in benzene and the product is induced to crystallize by the addition of hexane and cooling. Clusters of crystals form (yield 20 parts), melting point 117.5° to 118° C.

Analysis shows $C_{19}H_{23}NO_3$: carbon 72.96% (theoretical 72.82%), hydrogen 7.43% (theoretical 7.40%) and nitrogen 4.38% (theoretical 4.47%).

Infrared analysis (CHCl$_3$) shows the presence of a monosubstituted amide (1510 and 1662 cm.$^{-1}$) and a hydroxyl group (3350 cm.$^{-1}$).

C-methyl analysis indicates the presence of one methyl group (4.80%).

*Example 9*

(3) *Benzyhydryl ester of muconic acid.*—Mercuric oxide (2.23 parts) is placed in a vial with 2.19 parts of benzophenone-hydrazone and a 20 ml. of a 1:1 solution of pentane-heptane is added. The vial is shaken for 6½ hours with cooling. The reaction product is filtered and to the filtrate there is added a solution of 0.20 part of muconic acid in 2 parts of methanol and the mixture is kept in the dark for 65 hours. After removal of the solvent, the residue is washed with methanol. After one recrystallization of methanol, a white powder is obtained melting at 144.5° to 145° C. Analysis shows $C_{32}H_{26}O_4$: carbon 81.02% (theoretical 80.98%), and hydrogen 5.47% (theoretical 5.52%).

*Additional properties of the muconate compound:*
Molecular formula: $C_{27}H_{34}O_9$
Calculated: carbon 64.52%, hydrogen 6.82%, oxygen 28.67%.
Found: carbon 64.40%, hydrogen 6.77%, oxygen 28.79%.

The compound in solution in a sodium barbital buffer (0.1 molar) is stable over a pH range of 4 to 7 when heated.

A terminal methyl determination gives 8.34% methyl, calculated as —CH$_3$. This corresponds to at least three methyl groups for a molecular weight of 502.6.

From the negative reaction with carbonyl reagents, it was concluded that the main carbonyl peak (1725 cm.$^{-1}$ in CCl$_4$) is that of an ester group in the molecule.

The saponification equivalent of the muconate compound was 168; the expected value based on three ester groups is 167.

Figure 2:
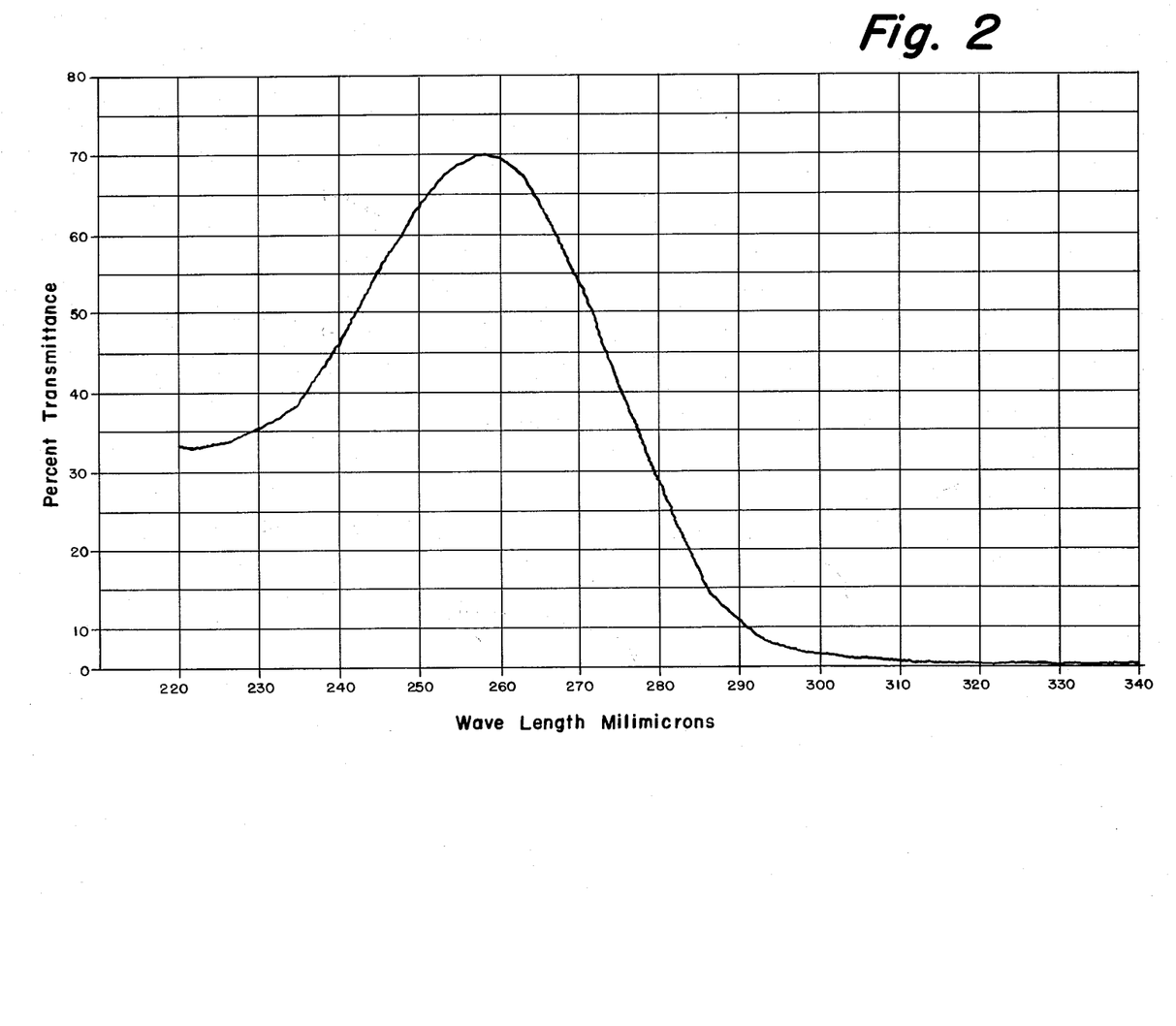

In the ultraviolet region of the spectrum, the maxima of the peak, λ max., appears in the wavelength range of 250 to 270 millimicrons, generally in the 250 to 265 millimicron range. The extinction coefficient maxima (E max.) appears to range from about 19,000 to about 29,000, generally from 21,000 to 26,000. These values of E max. appear dependent on the sensitivity of the analytical instruments, and their capacity to detect isomeric forms of the muconate compound. The variations due to isomerism may also be detected in the infrared region of the spectrum, mainly in the 5.8 to 6.5 micron range. A sample of the muconate compound of the invention shows a peak, λ, at about 258.5 millimicron and an E max. appearing at about 21,200 (FIG. 2).

The compound of the invention is soluble in varying degrees in organic liquid solvents having a dielectric constant within the range of 21.5 to 2.2 at 20° C. Illustrative solvents in this dielectric range include: cyclohexanone, acetone, acetic acid, acetonitrile, methylacetone, n-butyric acid, benzonitrile, iso-n-butyric acid, trimethylamine, butyraldehyde, dimethyl ether, formamide, diethyl ether, tetrahydrofuran, acetamide, dimethylformamide, dimethylacetamide, octyl alcohol, xylene, amyl acetate, amyl alcohol, aniline, n-butyl acetate, benzyl alcohol, dimethylaniline, isobutyl acetate, n-butyl alcohol pyridine, isobutyl alcohol, quinoline, cresol, cyclohexanol, trichloroethylene, carbon tetrachloride, carbon disulfide, chlorobenzene, heptane, benzene, toluene, chloroform, and dichlorobenzene. The solubility of the muconate compound seems to tend to decrease in solvents having a dielectric constant ranging from 2.2 to about 1.5 and ranging from 21.5 to 35, at 20° C. Typical solvents in the lower dielectric constant range include cyclohexane, hexane, and the like. The solvents having a dielectric constant in the higher range include furfural aldehyde, glycerol, glycol, methyl alcohol, and nitrobenzene. The varying degrees of solubility of the muconate compound in organic liquid solvents having a dielectric constant in the broad range of 1.5 to 35.0 at 20° C. may be subject to some exceptions, there being some special circumstances where the muconate compound appears to have a solubility in the particular solvent somewhat different from what would be expected from the dielectric constant. In water, which has a dielectric constant of 80, the muconate compound is sparingly soluble.

Other properties of the muconate of the invention are illustrated below.

*Example 10*
TETRAHYDROMUCONATE

To a hydrogenation flask containing palladium on charcoal (0.1053 part) and 40 ml. of ethanol, there is added solution of 960 parts of muconate in 70 ml. of ethanol. The mixture is hydrogenated at room temperature. The total of 2.80 moles of hydrogen are absorbed per mole of muconate. The product is isolated giving a clear oil which crystallizes on standing at room temperature, melting point 113.5°–114.5° C. with softening.

The infrared spectrum of the tetrahydromuconate shows a single carbonyl peak at 1742 cm.$^{-1}$ (CCl$_4$). No double bond bands appear in the 1600 cm.$^{-1}$ region.

*Example 11*
MUCONATE DIACETATE 0.2437 part of muconate is placed in a 50 ml. round-bottom flask with 7 ml. of anhydrous pyridine and 50 ml. of acetic anhydride. The solution is heated on a steam bath for 15 minutes and then evaporated at reduced pressure at about 50° C. The viscous oily residue is taken up in chloroform, washed with 3 N sulfuric acid, and then three times with water. After the chloroform is separated and the product dried, a colorless solid residue is obtained. This material is purified by chromatography in alumina and then recrystallized from ethanol-water giving muconate diacetate needles which decompose slowly on heating at 230° C.

Acetate analysis, calculated as CH$_3$CO, shows 13.78% acetate to be present indicating that a diacetate has formed (calculated for two acetates, 14.67%). The molecular weight (Rast) is found to be 593 and 581 (average 587) in two determinations. An empirical formula of C$_{2.8}$H$_{3.5}$O is calculated corresponding to a molecular formula of C$_{31}$H$_{38}$O$_{11}$.

Analysis shows C$_{31}$H$_{38}$O$_{11}$: carbon 63.24% (theoretical 63.46%), hydrogen 6.68% (theoretical 6.53%), and a molecular weight of 593 or 581 (theoretical 586.6).

The infrared spectrum of the muconate diacetate is as expected. Carbonyl peaks appear at 1725 cm.$^{-1}$ due to the acetate and at 1726 cm.$^{-1}$ assignable to a conjugated ester.

The average molecular weight found for the muconate diacetate C$_{31}$H$_{38}$O$_{11}$ is 587. By deducting 84, the weight of the two acetyl groups, a molecular weight of 503 is obtained for the muconate, C$_{27}$H$_{34}$O$_9$. This again confirms the molecular weight of 496±15 found for the muconate and again confirms its uniqueness.

The muconate of the invention is a unique compound which exhibits an antifungal spectrum of remarkable toxicity. The two following tables illustrate the high toxicity and specificity of the muconate on fungi. Table VIII shows the antifungal effect of the muconate.

Table IX lists typical bacteria which are found unaffected by 50 gammas/milliliter of the muconate.

Toxicity against fungi is determined by seeding a suitable nutrient broth containing varying amounts of the muconate compound and determining the minimal concentration of the muconate which fully inhibits growth of the microorganism tested. Incubation is at 26° C. for 48 hours.

Effect on bacteria is determined by adding the muconate in increasing amounts up to 50 μg./milliliters to test solutions of melted potato-dextrose agar. The tests are run by seeding nutrient broth with test microorganisms and determining the minimal concentration of the muconate which will fully inhibit growth of the microorganism tested. The nutrient agar is dispensed into Petri dishes where it is allowed to harden. Controls are muconate-free plates. The surface of the plates are streaked with a heavy culture of the bacterium to be tested. Good growth of the bacterium after 48 hours incubation at 30° C. indicates lack of toxicity of the muconate on the bacteria up to this level of the muconate. No growth at that time is a demonstration of the toxicity of the muconate against the particular bacteria tested.

TABLE VIII

*Antifungal Effect of the Muconate Compound*

| Fungi: | Inhibitory concentration in gamma/milliliter |
|---|---|
| Phytophthora infestans | 5 |
| Phytophthora cactorum | 50 |
| Phytophthora cinnamomi | 5 |
| Phytophthora citrophthora | 20 |
| Sclerotina fructicola | 5 |
| Sclerotina sclerotiorum | 5 |
| Fusarium solani | 10 |
| Alternaria oleracea | 5 |
| Botrytis cinerea | 5 |
| Cercospora apii | 5 |
| Aspergillus oryzae | 40 |
| Aspergillus niger | 50 |
| Phoma spp. | 50 |
| Trichoderma viride | 50 |
| Chaetomium globosum | 5 |
| Penicillium digitatum | 5 |
| Fusarium linii | 10 |
| Penicillium expansum | 20 |
| Stemphylium sarcinaeforme | 20 |
| Pythium ultimum | 5 |
| Neurospora crassa | 10 |
| Saccharomyces lactis | 5 |
| Torula cremoris | 5 |
| Torulopsis utilis | 5 |
| Saccharomyces fragilis | 5 |
| Zygosaccharomyces ashbyii | 5 |
| Saccharomyces cerevisiae | 5 |

TABLE IX

*Bacteria Unaffected by 50 Gamma/Milliliter of Muconomycin*

| | |
|---|---|
| Aerobacter aerogenes | Bacillus megatherium |
| Escherichia coli | Proteus morgani |
| Bacillus brevis | Shigella sonnei |
| Bacillus mycoides | Eurwinia carotovora |
| Bacillus mesentericus | Agrobactium tumafaciens |
| Staphylococcus aureus | Pseudomonas solanacearum |
| Bacillis subtilis | |

The remarkable toxicity of the muconate of the invention against fungi makes this compound especially valuable for combating fungal infestations on materials and products susceptible to fungal growth. Particularly important is the use on agricultural and horicultural plants and products. Fungi-toxicity of the muconate against *Phytophthora infestans* makes this new substance very valuable for the control of late blight of potatoes and tomatoes. *Phytophthora infestans* causes lesions on leaves, on stems, and on the tuber of the potato. Extensive damage to tomatoes is produced by brown spots on the seedlings, the mature plants, and the fruit; ultimately death is caused. Phytophthora spp. is responsible for cankers and diebacks on trees like the maple, oak, elm, and beech. *Phytophthora cinnamomi (cambivora)*, against which the muconate is toxic, causes basal canker on trees, like on the maple, especially affecting the valuable Norway maple. Crown canker of dogwood, dieback of rhododendron, and trunk canker of cherry, peach, and apple trees are caused by related species. Activity of the muconate against Fusarium spp., is important because these fungi are responsible for root rot of vegetables, particularly of peas and beans. *Fusarium solani* is also associated with wilt on tomatoes, watermelon, celery, cowpea, and potatoes. *Fusarium linii* also destroys by rots and blights; it causes wilt and rust on crops like flax and cotton. The muconate is suggested to combat *Sclerotinia fructicola* infections which cause various rots, affecting fruit trees, including stone and pome fruits as apples and pears. *Sclerotinia sclerotiorum* causes water-soft rot of vegetables like lettuce and endive; cotton rot of beans, carrots, cucumbers and other cruifers and curcurbits. It is responsible for root rot of celery. *Sclerotinia sclerotiorum* also is responsible for stem rot of pepper, tomatoes, and of many ornamentals, such as of dahlias, zinnias, and others. This fungus also attacks fruit trees causing green fruit rot of almond, peach, apricot, and also of strawberry and fig trees. *Alternaria oleracea*, against which the muconate is toxic, causes black leaf spots and brown rot of crucifers, such as cabbage, turnips, garden cress, and radishes, and *Botrytis cinerea*, which is responsible for the extensive damage done by gray mold blight on buds and blossoms. Botrytis blight is of general distribution on many flowers, fruits, and vegetables. It effects peaches, plums, and quince. It causes twig blight on citrus and storage decay on lemons. This fungus also afflicts vegetables like lima beans, endive, snapbeans, seedlings or in storage after harvest, and here the muconate provides a valuable means for control. It is known to cause blight among ornamentals such as seeping blight of pine and of rhododendron. It causes serious loss on numerous ornamentals, such as gladiolii, geraniums, begonias, asters, and dahlias. Cercospora spp. is responsible for early blight of vegetables. *Cercospora apii* causes the early blight of celery as it is responsible for lesions on the leaves. Here, the muconate control is particularly valuable since no effective cure of this disease is presently known. Phoma spp. cause root rot of vegetables causing stuning of celery, tomatoes, and peppers. These fungi also infect the soil, and control with the muconate of seed and soil treatment is an advisable method for combating these fungi. *Trichoderma viride* is involved in the green mold rot found on narcissus, garlic, and on citrus fruits. *Chaetomium globosum* causes rotting of vegetable fabrics and of natural and synthetic cloth. The muconate compositions are, accordingly, suggested for preservation of textiles. Penicillium spp. such as *Penicillium digitatum*, causes injury to citrus fruit by the green mold rot; *Penicillium expansum* is associated with the blue mold rot of many fruits, such as on avocado, pears, quince, and apple. Damage may be caused before harvest or during harvest and during packing. Accordingly, the muconate may be advantageously used to protect citrus fruit by applications to the fruit, to paper wrapping, to plastic bags and the like. The muconate compound is active against *Pleospora herbarum* (conidial stage *Stemphylium sarcinaeforme*). This parasitic fungus is the cause of leaf spots of various leguminous crops, such as clover. This fungus also injures ornamentals causing leaf blight of lilac and the seed mold of china asters and other plants. The Pythium genus damages plants by causing cotton leak, root rot, damping-off of seedlings, such as of potatoes, sugar beets, papaya, melon, and radishes, just to name a few. The *Pythium ultimum* hypae grow through the soil entering seedlings through the epidermis. Hence, pre-emergence control with application of the muconate compositions to the soil is a suggested useful manner of control. The Neurospora genus is related to the ripe rot of pear. Saccharomyces is a yeast type which is a contaminant in cheese and in other dairy products. *Saccharomyces lactis* causes undesirable fermentations and off-flavors in dairy products. Accordingly, even yeast infections may be fought with the muconate. The aspergilli species are responsible for many rot diseases, leaf spots or blights. *Aspergilus niger* causes calyx-end rot of dates, fig smut, bunch mold of grapes, black mold rot of peach and rot of pomegranates. This fungus also causes storage rot on onions, shallot, apples, and potatoes.

Accordingly, at the present time, a primordial utility of muconate-containing compositions is in combating infestations of fungi. Of great interest is control of fungi on plants, plant organs, plant products, and other material susceptible to fungal attack. In the present invention, the term "fungi" is employed in the traditionally recognized sense and includes yeast within the fungus group. Plant organs include seeds, roots, flowers, fruits, and the like. Plant products include paper, textiles, wood products, and the like. Other materials susceptible to fungal growth include leather, furs, paints, resins, foods, glass, cement, metals, and the like. All such materials may be generically designated as materials susceptible to fungal growth. In accordance with this invention, the muconate compound is a useful substance for controlling such infestations.

Plant disease control may be accomplished by exclusion, i.e., by preventing the establishment of pathogenic fungi, by eradication, by protection, by immunization, or by combining any such methods. Effective control may be obtained in the case of saprophytic and parasitic fungi. Applications of the muconate may be made to the plants and/or their organs and/or their environment. Accordingly, by the term "fungitoxicant" we include broadly the property to affect fungi in one or in several ways and not only the property of destroying fungi and inhibiting their growth, and also the property of inhibiting the germination of spores or sporulation of the fungi, the property sometimes referred to as fungistatic.

To affect the fungi, the muconate should be applied in a fungitoxic amount; this may range from traces lower than 0.1 p.p.m. to 1,000,000 p.p.m.; application may be made of crude or pure muconate. For applications to non-vegetative or non-living materials, applications of the muconate in amounts from about traces, i.e., amounts less than 0.1 p.p.m. to 100,000 p.p.m. cover a range generally adequate. When it is desired to take advantage of the muconate's chemoprophylactic effect, application in the range of 0.1 to 1250 to a location such as on the plant or in its environment is normally adequate to deter future fungal infestations. Accordingly, it may be seen that our new substance is also useful for protecting and deterring future fungal invasion or to combat and control present and existing fungal infections in any state whatsoever, be it for instance in the spore, vegetative or sexual stage. One useful aspect of the use of the muconate is deterring secondary infestations which may set in after the start of primary infections. Accordingly, useful compositions may contain one or more ingredients active in combating the desired microorganisms and also containing the muconate to deter secondary infestations.

For combining fungal growth on such materials susceptible to fungal growth, the muconate may be employed as such alone or in any suitable composition. The broth in which the muconate is produced, and which may or may not contain the mycelium, may be used as such; also the broth may be freed of materials, other than the mycelium, which may be present after the process of growing the fungi. The broth may be concentrated or not. The muconate may also be employed in more purified forms, as in crystalline forms. The muconate in any degree of purification or crude form may be employed in conjunction with suitable adjuvants, such as carriers and/or distributing agents. These adjuvants may have a synergistic effect with the muconate; they may have an effect independent from the muconate on the materials to which the muconate composition is applied. Conveniently, the muconate may be formulated into solid or liquid compositions, such as dusts, wettable powders, sprays, concentrates, emulsions, and the like.

The fungitoxicity of the muconate of the invention may be tested as follows:

FUNGITOXICITY TEST

Various formulations and concentrations of the muconate are sprayed on test plants which are then inoculated with spores of the fungus responsible for a particular disease, and the number of disease lesions which develop are determined. Tomato plants are sprayed with the test muconate preparation. Amounts supplied are expressed in parts per million of muconate material. After the fungicide deposit has been allowed to dry on the plants, they are evenly inoculated with a heavy asexual spore suspension of the test fungi. Following inoculation, the plants are maintained for 12 hours in the infection chamber which is maintained at 12° C. and 100% relative humidity. Subsequently, the plants are incubated for an additional period of 24 hours at 23° C. Lesions develop on the trifoliates. Total number of lesions on trifoliates are counted for all treatments and controls. Controls are plants treated in an identical manner except that no muconate is applied on the plants. When comparative results with other fungitoxicants are desired, there are used other well-recognized fungitoxic antibiotics, such as streptomycin salt and a highly regarded agricultural fungicide, such as zineb, zinc ethylenebisdithiocarbamate, or maneb, the manganese salt. In these tests shown, zinc ethylenebisdithiocarbamate is designated as zineb.

Percent control achieved by the test solution is calculated by the following formula:

$$\text{Percent control} = 100 - \frac{\text{Incidence of lesions for compound tested}}{\text{Incidence of lesions for control}} \times 100$$

In standard fungitoxicity tests wherein the inhibition of germination of spores of *Stemphylium sarcinaeforme, Monilinia fructicola*, and *Alternaria solani* was tested, the muconate was found to have an $LD_{50}$ value of 1 to 10 parts per million. The phytotoxicity of the compound on plants is tested by applying the substance to run-off in a standard formulation in concentrations of 1, 5, 10, 25, 50, 75, and 100 p.p.m. to vegetables, ornamentals, and fruit trees. After 8, 12, 24, and 48 hours, there is no evidence of phytotoxicity on the plants.

The toxicity against fungi of a crude broth of muconate is demonstrated below by testing young tomato plants infested with late blight.

TABLE X

*Fungitoxicity of Muconate Broth*

| Material | P.p.m. | Lesions |
|---|---|---|
| Muconate filtered crude broth | 3 | 3.5 |
|  | 1.5 | 5 |
|  | 0.75 | 9 |
| Muconate unfiltered crude broth | 30 | 3 |
| Zineb | 300 | 15 |
|  | 150 | 30 |
|  | 75 | 40 |
| Streptomycin | 50 | 18 |
|  | 25 | 26 |
|  | 12 | 33 |
| Control |  | 80 |

From these results, it is apparent that even a crude broth containing as little as 0.75 p.p.m. of the muconate broth is a valuable composition for controlling fungi. Significant control of late blight infestations with crude broths containing 0.1 to 0.5 p.p.m. of the muconate is achieved by applications to tomato plants. Likewise, control of tomato blight results when a crude, unfiltered broth is dried and when the resulting powdered composition is applied to the tomato plants.

Comparable results are obtained when potatoes infested with *Phytophthora infestans* infections are treated with crude culture broth. Early blight on tomatoes and potatoes caused by *Alternaria solani* may be similarly controlled.

The potency of the muconate in crystalline form in various concentrations is illustrated below by applications to tomatoes infested with *Phytophthora infestans*. The crystalline muconate is dissolved in appropriate amounts in acetone and diluted with water to make up the desired concentration in 10% aqueous acetone.

TABLE XI

*Fungitoxicity of the Crystalline Muconate*

| Compounds | Lesions | | Percent control | |
|---|---|---|---|---|
|  | 1.0 p.p.m. | 10 p.p.m. | 1.0 p.p.m. | 10 p.p.m. |
| Muconate | 69.5 | 27 | 43 | 78 |
| Streptomycin | 88.0 | 78 | 28 | 36 |
| Control | 122.5 | 122.5 |  |  |

*Percent Control Imparted by the Crystalline Muconate*

| P.p.m. | 156 | 78 | 66 | 50 | 39 | 33 | 25 | 16 | 12 | 10 | 1 |
|---|---|---|---|---|---|---|---|---|---|---|---|
| Muconate |  |  | 100 |  |  | 96 |  | 92 |  | 78 | 43 |
| Streptomycin |  |  |  | 90 |  |  | 82 |  | 82 | 36 | 28 |
| Zineb | 74 | 51 |  |  | 31 |  |  |  |  |  |  |

The data demonstrate the high toxicity of the crystalline muconate. Similarly, effective control of potato late blight is obtained with low concentrations of muconate.

To illustrate the weathering characteristics of the muconate, a tenacity test is run as follows:

TENACITY TEST

One-half of a lot of tomato plants is treated with desired amounts of the muconate and the tomato plants are incubated for three days at 24° C. After three days, the plants are taken out of the incubation chamber. The other half of the lot is then treated with the muconate and to both lots there is supplied a heavy inoculum *Phytophthora infestans*. All the plants are incubated for 16 hours at 12° C. in a saturated atmosphere, then incubated at 24° C. for 4 days. Readings of all lesions are then taken. Lesions on plants supplied with the muconate on the first day, after three days are recorded.

TABLE XII

*Tenacity of the Muconate Compound*

| Fungicide | P.p.m. | Percent control | |
|---|---|---|---|
|  |  | 0 days | 3 days |
| Filtered crude broth | 5 | 89 | 92 |
| Streptomycin | 100 | 97 | 94 |
| Zineb | 100 | 65 | 45 |
| Control |  | 0 | 0 |

The data show that initially over 85% control is obtained with the muconate although the broth is 20 times less concentrated than the commercial preparation of streptomycin. After three days, effective protection is still imparted by the muconate.

In accordance with this invention, there may be prepared liquid or solid compositions containing at least one adjuvant with the muconate of the invention. Liquid compositions containing the muconate may be prepared by dissolving the muconate in one or more of the suitable organic liquids discussed above. Convenient ones include acetone, methylene chloride, chlorobenzene, petroleum distillates, chlorinated hydrocarbons, such as trichloroethylene. The preferred organic solvent carriers are those which are adapted to accomplish the penetration and impregnation of the soil with the toxicant substance, and are of such volatility as to evaporate from the growth media and leave little permanent residue therein. Particularly desirable carriers are the petroleum distillates boiling almost entirely under 400° F. at atmospheric pressure and having a flash point above about 80° F. These liquid compositions may be prepared as concentrates of the muconate which may conveniently be used for later dilution to the desired concentration of time of application to the materials to be treated. In the concentrates, the muconate may conveniently vary over a very wide range of concentrations, such as from 0.01 to 95% by weight or even higher dosages ranging conveniently from 100 to 950,000 p.p.m. or even higher. Dilution to supply the desired dosage for control of fungi may conveniently be prepared with water, preferably with the aid of a suitable surface active, dispersing, or emulsifying agent, especially when the solvent is of a water-immiscible type. Dispersing and emulsifying agents that may be employed in the compositions include surface active condensation products of alkylene oxides, such as ethylene oxide, with alkylphenols or long-chained alcohols, mercaptans, or carboxylic acids, alkyl and alkylaryl sulfonates, alkyl sulfates, alkyl amides, fatty acid esters of polyhydric alcohols, or ethylene oxide addition products of such esters. The choice of dispersing and emulsifying agents and the amount thereof is dictated by the requirements of the particular application and use intended.

A typical liquid emulsion of the muconate may be prepared by dissolving 12.5 parts of the muconate in 10,000 parts of petroleum distillates. This solution is dispersed with vigorous agitation in 9,900 parts of water containing 5 parts of an alkylaryl polyether alcohol to provide a dispersion containing 500 p.p.m. of the muconate of the invention. This liquid composition has excellent fungitoxicity against early and late blights of tomato and potato.

In the preparation of dust compositions, the muconate is dispersed in and on a finely divided solid carrier, such as talc, gypsum, aluminum silicate, clay, diatomaceous earth, and chalk. Inert carriers are preferred. When rapid release of the muconate is desired, a nonadsorbing carrier is preferred, whereas adsorbing carriers may have advantages when a gradual release of the muconate is desirable. Preferably, the finely divided carrier is mixed or wetted with the fungicide or a solution thereof in a suitable volatile organic solvent. The dust compositions may include wetting and sticking agents and/or surface active dispersing agents. Compatible liquid wetting agents may also be used by adsorbing them on an inert carrier for blending purposes to prepare wettable powders which may also include a dispersing agent, such as a condensed formaldehyde-naphthalene sulfonate or a lignin sulfonate. Depending upon the proportion of ingredients, these dust compositions may be employed as concentrates and subsequently diluted with additional solid surface-active dispersing agent or talc, chalk, gypsum, and the like to obtain the desired amount of active ingredient in a composition adapted to be distributed in soil. Also such concentrate dust compositions may be dispersed in water, with or without the aid of a dispersing agent, to form aqueous soil-treating compositions. A typical useful dust may be prepared by mixing 10 parts of the muconate, 87 parts of clay, and 3 parts of kaolin. This dust is useful in agricultural practices for controlling fungi.

The concentration of the muconate in liquid and powder formulations preferably is in fungicidal amounts, i.e., in such proportion sufficient to be toxic to the fungi under the particular conditions of application. The Muconomycin-containing compositions may contain the active substance in concentration in the range of about 10 p.p.m. to 950,000 p.p.m. though, as noted above, the muconate may be employed undiluted. The actual amounts applied may vary considerably depending upon the particular circumstances, conditions, seasons, particularly the type of fungi, its stage of growth, the plant, plant organs, and plant product or material treated. In the treatment of plants and their organs, useful ranges may vary in the 0.1 to 1250 p.p.m. range. In the treatment of soil or other growth media of plants, the muconate compositions may be supplied in a dosage of 0.1 to 10,000 p.p.m. Higher ranges may be useful for seed and soil treatment in combatting typical soil-carried fungus infestions such as those caused by *Fusarium solani*, Pythium spp. and *Rhizoctonia solani*. For treating textiles, paper, and resins, even higher concentrations such as 30,000 or 100,000 p.p.m. may be used where possible side-effects are no primary consideration.

Further illustration of the value of the muconate is in the control of fungal diseases on ornamentals. For this purpose, a wettable powder may be prepared by mixing 25 parts of substantially pure muconate in 2 parts of clay with 3 parts of an alkylaryl polyethylene glycol ether on clay. One-half pound of this wettable powder when diluted with 100 gallons of water provides a spray containing about 500 p.p.m. of muconate. The spray is particularly effective in controlling gray mold blight caused by *Botrytis cinerea* on ornamentals. Treatment of strawberries and raspberries infested with gray mold disease effectively reduces infestation. Control of infestation of peach rot due to *Sclerotinia fructicola* is obtained with satisfactory results.

Protection of celery plants against Cercospora early blight may be demonstrated by application of a wettable powder which is prepared by mixing 25 parts of the muconate with 20 parts of clay, 3 parts of a mixture of octylphenoxypolyethoxyethanol on magnesium carbonate and 2 parts of kaolin. Two pounds of the resulting wettable powder is diluted with 100 gallons of water to give a muconate potency of about 1,250 p.p.m. The suspension is sprayed onto seed beds of celery plants to give protection against celery blight.

A dust composition containing 50,000 p.p.m. of the muconate is made up with gypsum and an alkylaryl polyether alcohol. This dust is useful for treating soil infested with *Fusarium solani*, Pythium spp., and *Rhizoctonia solani*. The composition is preferably distributed to the surface of a furrow seed row for suppression of seedling diseases. In general, good results are obtained when the composition is distributed through the soil. Satisfactory control of root rot of cotton, sugar beets, and lima beans is obtainable. Comparable success is achieved when a soil dressing is applied in a liquid spray.

Pre-emergence and post-emergence damping-off of vegetable seedlings caused by species of Pythium, Botrytis and Fusarium may be combatted by seed coatings. For such purposes, wettable powders or dusts are suggested. Vegetable seeds, such as beans, carrots, peas, or grains like corn, rye, oats, forage grasses, such as alfalfa and timothy, may be treated to minimize losses caused by the disease. Green mold rot of citrus fruit caused by *Penicillium digitatum* is effectively combatted by dispersing the muconate, preferably in conjunction with a suitable surface active agent in wash water of the fruit. Final concentration of the muconate may range from 0.1 to 10,000 p.p.m. Oranges, lemons, and grapefruit respond well to the treatment. Blue mold rot attributed to *Penicillium expansum* on avocado, pears, and apples is similarly combatted. Paper wrappers treated with the muconate tend to decrease mold infections on stone fruits. Plastic bags for bananas may be similarly treated. Fruit treated in this manner has a decreased tendency to be infected by the mold upon packing, storage, or shipping. Oil-in-water emulsions are also useful for treating the fruits, seed, and plant tubes, such as potatoes during storage.

The unusually high level of toxicity of the muconate permits its use in low concentration. This aspect of our invention is illustrated in the control of late blight of tomato with crystalline muconate, the values given are lesions on trifoliate.

TABLE XIII

*Effects of Low Concentrations of the Muconate Compound*

| Concentration (p.p.m.) | | 0.1 | 1 | 10 |
|---|---|---|---|---|
| Muconate | | | 48 | 4.3 |
| Streptomycin | | | 30.5 | 38.5 |
| Control | 73.3 | | 58 | 42.5 |

In a similar manner, there are prepared wettable powders and sprays containing about 0.1 p.p.m. of the muconate for combatting stone rot on peaches and plums caused by *Sclerotinia fructicola*. Infestation of black leaf spot and leaf browning attributed to *Alternaria oleracea* on cabbage and garden cress may be controled in a like manner.

In an amount of 0.01 p.p.m., the muconate still regulates the growth of fungi. The potency of low concentrations of the muconate suggests economical use of the muconate without sacrificing appreciable toxicity. The muconate may be used in conjunction with one or more other pesticides; it may be used in conjunction with other fungicides, such as the salts of ethylenebisdithiocarbamic acid, bactericides, miticides, ascaricides and also other antibiotics. In special situations, the muconate may be applied by aerosol methods. Solutions of the muconate for aerosol treatment are prepared by dissolving the muconate alone or in combination with other ingredients, in suitable highly volatile liquid carriers like trifluoromethane.

Another very important aspect of this invention is the control of fungi on materials subject to undesirable fungal growth. Such materials may or may not be of plant origin. Materials for which the muconate compositions are valuable include plant products like wood, cotton, silk, wool, linen, synthetic fabrics like rayon, Dacron and mixtures of synthetics with natural fabrics; also leather or synthetics like resinous materials, paints, concrete, asphalt, bricks, stone, and glass; in general, all material subject to fungal growth. For application to materials susceptible to fungal growth fungicidal and generally chemoprophylactic amounts, such as from 5 to 100,000 p.p.m. provide adequate deterrent for fungi. In application to organic materials susceptible to fungal attack, the muconate may be applied in the form of a concentrate in an organic solvent, preferably of the volatile type. Incorporation of a wetting agent may be advisable for promoting more complete contacting of the material treated. The article treated may be treated by spraying, dipping, or brushing. In that connection, the toxicity of the muconate against aspergilli and penicillia is significant since these molds attack wood, paper, cloth, felt, and the like. Another interesting application of the muconate is the control of fungi which causes "fouling" of optical instruments. In this manner, the glass of such instrument is maintained free of objectionable fungal growth, as of *Aspergillus niger* and of other fungi. Similarly, inhibition or control of cotton cloth rot, which often is caused by *Chaetomium globosum*, may be obtained by judicious applications of the muconate. Such control is illustrated below.

*Example 12*

To a series of Erlenmeyer flasks, there is added the following basal medium made up with 3 parts of sodium nitrate, 1 part of potassium monophosphate, 0.25 part of potassium chloride, 0.25 part of magnesium sulfate heptahydrate, and 0.01 part of ferrous sulfate. To the basal medium, there are added patches of $2 \times 6$ cm.$^{-2}$ of Indian Head muslin, the muslin providing the only available source of carbon in the medium. The flasks containing medium are stoppered with cotton and sterilized for 15 minutes at 15 p.s.i. After the flasks are cooled, there is added to the flasks a 0.5 ml. heavy spore suspension of *Chaetomium globosum*. There are also added to the flasks aqueous suspensions of the muconate in dilutions to provide concentrations from 100 to 5 micrograms per ml. Several flasks containing no muconate serve as controls. The flasks are incubated at 28° C. for three days, after which time growth of fungi is noted in the controls having muslin patches unprotected by the muconate. After 5 days, it is noted that the unprotected muslin patches are covered with very profuse black growth of *Chaetomium globosum*. The muslin patches protected with at least 5 micrograms per ml. of the muconate were totally free of *Chaetomium globosum* infestations. Standard tensile strength tests on a Scott tester for textiles show that the muconate-treated muslin samples have retained greater tensile strength than the corresponding unprotected muslin patches.

In a similar way, wool fabrics, rayon, Dacron, and blends of synthetic and natural fabrics are protected from fungal infection by spraying the cloth with the muconate-containing compositions. Likewise, effective fungal protection is obtainable by immersing the textiles in baths containing the muconate in amounts ranging from traces to 100,000 p.p.m., especially from 5 to 50,000 p.p.m. Another useful application of the muconate is mildew- and fungi-proofing of paper and cloth bags used in the storage of various products including agricultural products, such as vegetables and potatoes. The muconate and its derivatives are expected to have other valuable applications in pharmacological and related fields.

We claim:

1. A muconate compound characterized by the following:

Molecular formula: $C_{27}H_{34}O_9$

Calculated: carbon 64.52%, hydrogen 6.82%, oxygen 28.67%

Found: carbon 64.40%, hydrogen 6.77%, oxygen 28.79%

Optional rotation: $[\alpha]_D^{30} = +192°$ (c. 1.2% in benzene)

Molecular weight: $496 \pm 15$

Melting point: Decomposes over 240° C.

Saponification equivalent: 168

Active hydrogen: 1.0

One peak, $\lambda$ max., in the ultraviolet region of the spectrum in the range of 250 to 270 millimicrons;

An extinction coefficient maxima, E max., in the range of 21,000 to 26,000;

The absence of alkoxyl groups;

Absorption bands in the infrared region of the spectrum of the muconate in a potassium bromide wafer, at the following frequencies expressed in reciprocal centimeters:

Absorption bands of the muconate compound: 3450, 2960, 1725, 1640, 1590, 1473, 1428, 1410, 1382, 1350, 1260, 1210, 1188, 1151, 1120, 1100, 1082, 1050, 1038, 1000, 969, 939, 929, 887, 828, 756, 736, 692

The infrared spectrum being characterized by the following:

a hydroxyl peak at 3557 cm.$^{-1}$, in $CCl_4$; double bond absorption bands at 1637 and 1591 cm.$^{-1}$, in $CCl_4$;

a carbonyl peak at 1725 cm.$^{-1}$ with shoulders at 1710, and 1740 cm.$^{-1}$, in $CCl_4$;

The muconate being further characterized by three main products of alkaline hydrolysis:
(1) Muconic acid,
(2) An alcohol A, which is characterized by crystals of a melting point of 156° to 157° C.;
a molecular formula: $C_{15}H_{22}O_4$
a molecular weight: 270–280 (Rast method); and
two active hydrogens;
Absorption bands in the infrared region of the spectrum of the alcohol in a potassium bromide wafer, at the following frequencies expressed in reciprocal centimeters: 3440, 3300, 2920, 1690, 1480, 1450, 1380, 1335, 1325, 1312, 1292, 1282, 1245, 1217, 1162, 1125, 1105, 1089, 1078, 1055, 1032, 1015, 985, 962, 922, 892, 873, 855, 832, 818, 772, 756, 732, 653; and
The infrared spectrum of alcohol A being characterized by:
two hydroxyl band at 3440 and 3300 cm.$^{-1}$ (KBr);
a double bond band at 1690 cm.$^{-1}$ (KBr);
and a band at 1380 cm.$^{-1}$ assignable to the vibrations of a C—$CH_3$ group (KBr);
(3) Alcohol B, a lactone of the formula 2. The composition of claim 1 and an adjuvant.
3. A muconate compound characterized by the following:
Molecular formula: $C_{27}H_{34}O_9$
Calculated: carbon 64.52%, hydrogen 6.82, oxygen 28.67%
Found: carbon 64.40%, hydrogen 6.77%, oxygen 28.79%
Optical rotation: $[\alpha]_D^{30} = +192°$ (c. 1.2% in benzene)
Molecular weight: 496±15
Melting point: Decomposes over 240° C.
Saponification equivalent: 168
Active hydrogen: 1.0
One peak, $\lambda$ max., in the ultraviolet region of the spectrum at about 258.5 milimicrons;
An extinction coefficient maxima, E max., at about 21,000;
The absence of alkoxyl groups;
Absorption bands in the infrared region of the spectrum of the muconate in a potassium bromide wafer, at the following frequencies expressed in reciprocal centimeters:
Absorption bands of the muconate compound: 3450, 2960, 1725, 1640, 1590, 1473, 1428, 1410, 1382, 1350, 1260, 1210, 1188, 1151, 1120, 1100, 1082, 1050, 1038, 1000, 969, 939, 929, 887, 828, 756, 736, 692
The infrared spectrum being characterized by the following:
a hydroxyl peak at 3557 cm.$^{-1}$, in $CCl_4$;
double bond absorption bands at 1637 and 1591 cm.$^{-1}$, in $CCl_4$;
a carbonyl peak at 1725 cm.$^{-1}$ with shoulders at 1710 and 1740 cm.$^{-1}$, in $CCl_4$;
The muconate being further characterized by three main products of alkaline hydrolysis:
(1) Muconic acid
(2) An alcohol A, which is characterized by crystals of a melting point of 156° to 157° C.;
a molecular formula: $C_{15}H_{22}O_4$
a molecular weight: 270–280 (Rast method); and
two active hydrogens;
Absorption bands in the infrared region of the spectrum of the alcohol in a potassium bromide wafer, at the following frequencies expressed in reciprocal centimeters: 3440, 3300, 2920, 1690, 1480, 1450, 1380, 1335, 1325, 1312, 1292, 1282, 1245, 1217, 1162, 1125, 1105, 1089, 1078, 1055, 1032, 1015, 985, 962, 922, 892, 873, 855, 832, 818, 772, 756, 732, 653; and
The infrared spectrum of alcohol A being characterized by:
two hydroxyl bands at 3440 and 3300 cm.$^{-1}$ (KBr);
a double bond band at 1690 cm.$^{-1}$ (KBr);
and a band at 1380 cm.$^{-1}$ assignable to the vibrations of a C—$CH_3$ group (KBr);
(3) Alcohol B, a lactone of the formula $\beta$-methyl-$\alpha$-hydroxyl-$\delta$-valerolactone.

References Cited in the file of this patent
Brian et al.: Nature, vol. 157, p. 334, 1946.